United States Patent Office 3,352,814
Patented Nov. 14, 1967

3,352,814
METHOD FOR MAKING CERAMIC BODIES
Glenn A. Collins, Jr., and Frederick L. Phelps, Jr., North Wales, Pa., assignors to Teleflex Incorporated, North Wales, Pa., a corporation of Delaware
No Drawing. Filed June 28, 1963, Ser. No. 291,246
10 Claims. (Cl. 260—41)

The subject matter of the present invention is a solid body made from powdered materials, and a method and composition for manufacturing same.

It is currently common practice, and has been for a number of years, to manufacture solid ceramic or metal bodies by heating a powder compact of the desired ceramic or metal to a temperature sufficient to cause sintering. For example, a large variety of metal products of various shapes and sizes are currently manufactured by heating metal powder, such as iron, to a temperature sufficient to cause the individual particles of iron to undergo incipient fusion and bond to each other. This art, often referred to as sintered powdered metal technology, is highly developed. And in the ceramics art, it is common practice to manufacture pure or mixed oxide bodies by heating the oxide or oxides sufficiently to cause sintering or vitrification. Extremely high temperatures are required, on the order of about 3000° F. for aluminum oxide which is the most commonly used material. There is no question but that extremely high quality solid bodies of ceramic or metal can be accomplished by the use of such techniques. However, because of the high heat and controlled firing conditions required, the articles so made are relatively expensive. Frequently, the quality of the product so attained far exceed the needed specifications or requirements for end use. Further, there are many materials which are so refractory as to be unsuitable for processing into solid bodies by the currently available processes. Hence, there is a need for an improved and less expensive method and composition for manufacturing solid bodies from powdered materials. Particularly as regards metal bodies, there is considerable incentive to fabricate from powder rather than by casting or machining solid stock since the metals in powder form are frequently available on the market at relatively low cost as compared with bar stock. For example, high purity nickel powder is quite inexpensive as compared with solid nickel bar stock of equal purity, this for the reason that the nickel in powder form results directly from the process whereby nickel is commonly refined. It will be manifest, therefore, that if the need could be fulfilled for a simple and inexpensive means to process any of a variety of solid particulate materials into high quality solid bodies of whatever shape desired, a variety of improved metallic and nonmetallic products could be manufactured at relatively low cost. The present invention fulfills this need.

Hence, it is an object of the present invention to provide improved solid bodies manufactured from powdered materials at relatively low cost.

Another and attendant object of the invention is the provision of an improved composition and process for fabricating solid bodies from powdered materials.

More specifically, it is an object of the invention to provide a composition consisting of a mixture of the powdered material desired to be processed into a dense solid body and a liquid material having unique characteristics as a heat curable binder for the powdered material whereby finished dense solid body products of high quality can be accomplished at low heat.

Still anothher object of the invention is the provision of a method and composition for manufacturing solid bodies having the unique combination of desirable physical properties.

The above and other objects, features and advantages of the invention will appear more clearly from the following detailed description made with reference to various preferred embodiments thereof.

Briefly, the invention comprehends a method and a composition, and the product resulting therefrom, wherein there is first formed a uniform mixture comprising from about 50 to 98 percent by weight powdered material and the remainder an aqueous liquid binder containing substantial amounts of phosphate ion, chromate or molybdate ion and metal ion, forming such mixture to the shape desired as by a pressing or molding operation and then drying and heat curing at a temperature and for a time sufficient to cause the binder to become water insoluble. In all of the preferred embodiments, the concentration of the phosphate ion in the liquid binder is at least about .5 mol per liter and preferably not exceeding about 4 mols per liter, that of the chromate ion at least .3 mol per liter and preferably not exceeding about 3 mols per liter, and that of the metal ion at least .2 mol per liter and preferably not exceeding 4 mols per liter. In many instances, and as will hereinafter be described in detail, it is desirable to additionally include in the liquid binder some polytetrafluoroethylene preferably in the form of a liquid dispersion thereof and in an amount of from about 10 grams to 1000 grams per liter of the binder liquid. Where the articles are shaped by a pressing operation, as is much preferred, the amount of the liquid binder used should preferably be from about 2 to 20% by weight of the total mixture on a wet basis. Upon curing, the binder material forms what appears to be an amorphous glassy matrix which is of complex chemical composition resulting from the interaction of the phosphate, chromate and metal ions, the overall composite of the binder matrix and the powdered material providing excellent strength and anticorrosion characteristics. Where metal powders are used as the powdered material, the finished cured articles can be buffed to provide a lustrous metallic finish indistinguishable from articles made of 100% sintered powdered metal. In general, the curing temperatures required on the order of from about 500° F. to 900° F., usually 625° F. providing excellent results, this as compared with the much higher sintering temperatures required to manufacture similar articles by conventional techniques.

The phosphate anion can be introduced into the aqueous binder solution in the form of phosphoric acid, in the form of metal phosphate or, as is preferred, it can be added in both forms. It will be understood that the term "phosphate" is intended to comprehend not only the $PO_4$ ion, but also the $HPO_4$ and $H_2PO_4$ and the hydrogen phosphate ions generally will, at least to some extent, be present in the compositions of this invention. Where phosphoric acid is used as an additive in making the compositions it is much desired to use the ortho acid, $H_3PO_4$, though the invention also comprehends the use of the other forms such as the meta or pyro acids, all ionizing in water to provide phosphate anion.

The chromate anion can be added either as chromic acid, or its anhydride $CrO_3$, or as metal chromate or dichromate. Combinations of the acid and the metal salts can, of course, also be used. If molybdate anion is used, it can be added as molybdic acid, or as the anhydride $MoO_3$, or as metal molybdate. The metal can be added either as a phosphate, chromate, dichromate, or, where molybdate ion is desired, as molybdate, all as indicated above. Also, the metal can be added, in whole or in part, in a form such as the oxide, hydroxide or carbonate, which will dissolve in phosphoric acid or chromic acid, in a typical acid-base reaction, to produce the phosphate or chromate. Of course, if the carbonate is used, carbon dioxide will be evolved. It will be manifest that where the metal is so added, for example, as oxide, at least some of the phosphate, chromate, or molybdate should be added in a form such as acid, to provide the acidity required for the acid-base reaction.

The following will more specifically illustrate the compounds which can be used for addition of the various ions.

Phosphate ion: phosphoric acid, the ortho acid being preferred; the monobasic, dibasic and tribasic phosphate salts preferably of the valence +2 or +3 metals, the magnesium salts being most desirable. The metal phosphate used should of course be sufficiently soluble to dissolve in the solution, though this does not mean that high solubility in water is essential since many of the phosphates not highly soluble in water are nevertheless soluble in acid sufficiently to be taken into the solution, at least in small quantity, where one of the other solution ingredients provides the acidity. However, for optimum ease in forming the solution and also for optimum final properties it is desirable to use predominantly of the monohydrogen or dihydrogen (i.e., the monobasic or dibasic) salts rather than the tribasic salts. Among the metal phosphates comprehended by the above for the practice of the invention are the following, it being understood that addition thereof can be either as the anhydrous salt or as is generally more convenient and economical, as the hydrate:

Monobasic magnesium phosphate—$Mg(H_2PO_4)_2$
Dibasic magnesium phosphate—$MgHPO_4$
Tribasic magnesium phosphate—$Mg_3(PO_4)_2$
Monobasic zinc phosphate—$Zn(H_2PO_4)_2$
Tribasic zinc phosphate—$Zn_3(PO_4)_2$
Aluminum phosphate—$AlPO_4$
Ferric phosphate—$FePO_4$
Ferric pyrophosphate—$Fe_4(P_2O_7)_3$
Ferrous phosphate—$Fe_3(PO_4)_2$
Monobasic lithium phosphate—$LiH_2PO_4$
Tribasic lithium phosphate—$Li_3PO_4$ Chromate ion: Chromic acid (or chromic acid anhydride, $CrO_3$); the chromate or dichromate salts preferably of the valence +2 or +3 metals, the magnesium salt being preferred. The following chromate-containing compounds within the purview of the above, satisfactory for practice of the invention, will illustrate it being understood here again that addition can be made as the hydrate.

Chromic acid—$H_2CrO_4$ or $CrO_3$
Magnesium chromate—$MgCrO_4$
Magnesium dichromate—$MgCr_2O_7$
Zinc chromate—$ZnCrO_4$
Zinc dichromate—$ZnCr_2O_7$
Barium dichromate—$BaCr_2O_7$
Lithium dichromate—$Li_2Cr_2O_7$
Sodium dichromate—$Na_2Cr_2O_7$ If it is desired to replace the chromate ion in whole or in part with molybdate ion, any of the following can be used: Molybdic acid, $H_2MoO_4$ or $MoO_3$; the molybdates of the valence +2 or +3 metals, zinc molybdate, $ZnMoO_4$, being preferred. There is no special advantage to including the molybdate ion for most uses of the compositions of this invention and molybdate has the disadvantage of higher cost. Also it does not provide composition properties as good as those attainable with chromate.

Metal ion: Any of the aforementioned phosphates, chromates, dichromates or molybdates can be used as the source of metal ion. Additionally, as alluded to previously, metal ion can be supplied in a form such as metal oxide, hydroxide, carbonate, etc. which will dissolve in acid, i.e., phosphoric acid, chromic acid or molybdic acid, to produce the metal phosphate, chromate or molybdate, and therefore the metal ion, plus water and/or gas which is evolved. The following metal compounds will illustrate those which can be added to generate the metal ion within the solution in accordance with the above; magnesium oxide MgO; Magnesium hydroxide, $Mg(OH)_2$; zinc oxide, ZnO; zinc hydroxide, $Zn(OH)_2$; aluminum hydroxide, $Al(OH)_3$; lithium oxide, LiO; lithium carbonate, $Li_2CO_3$; calcium hydroxide, $Ca(OH)_2$.

As alluded to previously, it will sometimes be advantageous to include Teflon, preferably in an amount of from 10 grams to 1000 grams per liter of the binder liquid. In this manner, for example, considerable lubricity can be imparted to the articles formed. The Teflon should preferably be added as an aqueous dispersion thereof, such aqueous Teflon dispersions being readily available on the market and consisting, in general, of Teflon suspended in water usually with a small amount of suitable emulsifier or wetting agent such as Duponol, to maintain the suspension. The amount of Teflon in such dispersions can range from as little as about 20% to upwards of 70% by weight and hence, the amount of dispersion added to the phosphate-chromate-metal ion solution to attain a given Teflon concentration will, of course, depend on the percent of solids of the dispersion being used. In mixing the solution to which the Teflon dispersion is to be added, account should be taken of the fact that water will be added by way of the dispersion and hence to attain a given ion concentration, a lesser amount of water should be initially included, the remainder of the water being supplied by the Teflon dispersion.

Whereas a Teflon dispersion is much preferred, it is also within the purview of the invention to use finely divided particulate Teflon, added in powder form, or Teflon in a suitable organic liquid such as ethyl alcohol, acetone or carbon tetrachloride which can be admixed with the phosphate-chromate-metal ion solution to form a slurry.

The only limitation as to the particulate materials which can be formed into solid bodies by the practice of the invention is that the material must be able to withstand the curing temperature, i.e., about 600° F. in the presence of the phosphate-chromate-metal ion binder liquid. Among the materials which have been successfully formed into solid bodies by practice of the invention are: the metal powders such as aluminum powder, copper powder, nickel powder; the refractory oxides, carbides, nitrides and silicides such as aluminum oxide, zirconium oxide, silica, silicon carbide, boron nitride, molybdenum disilicide; the dry lubricants such as graphite, molybdenum disulfide, tungsten disulphide and lead oxide. Frequently, it will be advantageous to form composites of two or more particulate materials. For example, cermet bodies can be formed from mixtures of ceramic and metal powders. Also, metal or ceramic parts with high lubricity can be formed by using graphite or molybdenum disulfide, for example, an admixture with the ceramic or metal powder. Teflon alone or in combination with the above dry lubricants can also be used.

The following specific Examples 1 through 6 will serve to further illustrate binder liquids useful for practice of the invention:

Example 1

| | Grams |
|---|---|
| $H_3PO_4$ | 196 |
| MgO | 50 |
| $Mg(H_2PO_4)_2 \cdot 6H_2O$ | 50 |
| $MgCr_2O_7 \cdot 6H_2O$ | 170 |
| Water to 1000 cc. | |

Example 2

| | |
|---|---|
| $CrO_3$ | 92 |
| $H_3PO_4$ | 323 |
| MgO | 72 |
| $H_2O$ to 1000 cc. | |

Example 3

| | |
|---|---|
| $MgCr_2O_7 \cdot 6H_2O$ | 174 |
| $FePO_4$ | 20 |
| MgO | 30 |
| $H_3PO_4$ | 196 |
| $H_2O$ to 1000 cc. | |

Example 4

| | |
|---|---|
| $CrO_3$ | 100 |
| $H_3PO_4$ | 196 |
| LiOH | 72 |
| $H_2O$ to 1000 cc. | |

Example 5

| | |
|---|---|
| $CaCr_2O_7 \cdot 3H_2O$ | 310 |
| $H_3PO_4$ | 294 |
| $H_2O$ to 1000 cc. | |

Example 6

| | | |
|---|---|---|
| $H_3PO_4$ | grams | 180 |
| $MgCr_2O_7 \cdot 6H_2O$ | do | 130 |
| Aqueous Teflon dispersion (60% solids) | cc | 330 |
| Water to 1000 cc. | | |

The binder solutions have an extremely long shelf life and hence can be made in quantity and used over a period of time as needed. Particularly where Teflon is included, however, the binder solution should be shaken thoroughly just prior to use.

Where the solid body is to be shaped by a pressing operation, the powdered material is admixed with the binder liquid preferably in an amount of from about 80% to 98% by weight powdered material and the remainder binder, on a wet basis. After thorough admixture, sufficient to cause substantially all of the particles to be wetted by the binder solution, the mixture is placed, still wet, in a suitable pressing die and pressed to form a dense self-sustaining green compact. The amount of pressure required will, of course, depend upon the compaction characteristics of the particular powdered material being used. Generally about 8 to 15 tons per square inch is desirable. For the attainment of high compaction, it is desirable that the powdered material have a grain size under 200 mesh and preferably no more than 325 mesh. Also, graduated grain size is desirable. After the compaction operation, the greeen self-sustaining compacts are dried, preferably at a temperature of about 100° and 200° F., and then cured at a temperature on the order of 600° to 800° F.

For some powdered materials, for example aluminum powder, it is often preferable to mold rather than press the body shapes. Where a molding operation is used, the amount of binder liquid used should be sufficient to impart considerable fluidity to the mixture. Hence, it will generally be desirable to use on the order of 50% to 80% of the powdered material and the remainder binder solution in the mix. Such mixture can be poured into a porous mold, allowed to dry preferably at a temperature on the order of 100° F. to 200° F., sufficiently, to provide a self-sustaining shaped article, removed from the mold and then further dried and cured by heating to a temperature of from about 600° to 800° F.

The following specific examples will serve to further illustrate.

Example 7

60 grams of graphite powder, grain size about 5 microns and finer, were mixed thoroughly with 5 cc. of the binder liquid set forth in Example 1 above. A portion of this mix was then pressed with 15 tons pressure to form a disc about 1 inch in diameter and ½ inch thickness. The pressed self-sustaining disc was then dried at 150° F. for 48 hours and cured for 2 hours at 600° F. The resulting disc had excellent strength and good electrical conductivity. One typical use of a graphite article so manufactured, but to generally rectangular rather than to round shape, is as a graphite brush for electric motors or generators. A copper or other metal lead wire can be bonded into the graphite article by insertion of one end of the wire into the pressing die such that the graphite mix is tightly pressed around the wire.

Example 8

82 grams calcium fluoride, grain size about 5 microns and finer, were mixed with 3 cc. of the binder liquid of Example 1 above. A portion of the resulting mix was then pressed, dried, and cured as in Example 7. The resulting disc had excellent strength and good inherent lubricity when polished.

Example 9

100 grams of silver powder, grain size 325 mesh and finer, were mixed with 6 cc. of the binder solution of Example 3 above. A portion of the mix was then pressed, dried and cured as in Example 7. The resulting disc has excellent strength and, after polishing has the appearance of pure silver. Electrical conductivity was excellent.

Example 10

225 grams copper powder, 325 mesh and finer, were mixed with 10 cc. of the binder solution of Example 6. A portion of the mix was pressed, dried, and then cured as in Example 7 above but at 800° F. The resulting disc had excellent strength and when polished had the appearance of polished pure copper. Further, the disc had good inherent lubricity and, surprisingly, excellent electrical conductivity albeit Teflon was included. One especially advantageous utility for copper bodies so manufactured is as commutators in electric motors and generators.

Example 11

40 grams aluminum powder, grain size about 5 microns and finer, were mixed with 24 cc. of the binder liquid of Example 1 above. The fluid mixture was then poured into a porous paper mold, dried at about 150° F. for 50 hours, removed from the mold and then cured at 600° F. for 2 hours. The molded article has excellent strength and when buffed gave the appearance of polished aluminum. If desired a thin porous paper mold or mold liner can be used which can be left on the molded article through the drying and curing operations, the paper burning off during curing.

Among the other powdered materials successfully pressed or molded into solid bodies in accordance with the invention are the following: lead oxide, lead titanate, molybdenum disulfide, lead silicate, alumina, silicon carbide, titanium nitride, boron nitride, zirconium diboride, ditungsten boride, chromic oxide and various mixtures of these materials.

It will be understood that while the invention has been described in detail specifically with reference to various preferred embodiments thereof, various changes and modifications may be made all within the full intended scope of the invention. No claim is made herein to the composition of the binder liquid per se or to coating compositions embodying the binder, such being the subject matter of United States patent application Ser. No. 291,271 (now U.S. Patent No. 3,248,251) and Ser. No. 291,248, now abandoned, filed concurrently herewith both continuations-in-part of United States applications S.N. 166,385, S.N. 166,386 and S.N. 166,398 filed Jan. 15, 1962, and now abandoned, and assigned to the assignee of the present invention.

We claim:

1. A method for manufacturing a unitary solid body from inorganic solid particulate material comprising the steps of mixing said inorganic solid particulate material with an aqueous liquid containing dissolved phosphate in an amount of from about .5 to 4 mols per liter, dissolved metal in an amount of from about .2 to 4 mols per liter, and dissolved material selected from the group consisting of chromate and molybdate, said dissolved material in an amount of from about .3 to 3 mols per liter, said particulate material being substantially insoluble in said aqueous liquid and, comprising 50 to 98% by weight of said resulting mixture, shaping said mixture to form a self-sustaining unitary solid body therefrom, and then heating said body to water-insolubility, said solid particulate material being sufficiently refractory to withstand said heating.

2. A method as set forth in claim 1 wherein said solid particulate material has a grain size under 200 mesh.

3. A method as set forth in claim 1 wherein the dissolved metal is predominantly of the valence of +2 and +3 metals.

4. A method for manufacturing a unitary solid body from inorganic solid particulate material comprising the steps of mixing said inorganic solid particulate material with an aqueous liquid containing dissolved phosphate in an amount of from about .5 to 4 mols per liter, dissolved metal in an amount of from about .2 to 4 mols per liter, and dissolved material selected from the group consisting of chromate and molybdate, said dissolved material in an amount of from about .3 to 3 mols per liter, said particulate material being substantially insoluble in said aqueous liquid, and comprising 80 to 98% by weight of said resulting mixture, pressing said mixture to form a self-sustaining unitary solid body therefrom, and then heating said body to water-insolubility, said solid particulate material being sufficiently refractory to withstand said heating.

5. A method as set forth in claim 1 wherein said aqueous liquid has admixed therein polytetrafluoroethylene in an amount of about 10 grams to 1000 grams per liter.

6. A method as set forth in claim 1 wherein said dissolved material is chromate.

7. A method as set forth in claim 1 wherein said particulate material is metal.

8. A method as set forth in claim 1 wherein said particulate material is graphite.

9. The method as set forth in claim 1 wherein said heating is carried out at a temperature from about 500° F. to 900° F.

10. A self-sustaining unitary solid body formed by mixing an inorganic solid particulate material with an aqueous liquid containing dissolved phosphate in an amount of from about .5 to 4 moles per liter, dissolved metal in an amount from about .2 to 4 moles per liter, and dissolved material selected from the group consisting of chromate and molybdate, said dissolved material in an amount of from about .3 to 3 moles per liter, said particulate material being substantially insoluble in said aqueous liquid and comprising 50% to 98% by weight of said resulting mixture, shaping said mixture to form a self-sustaining unitary solid body therefrom, and then heating said body to water-insolubility, said solid particulate material being sufficiently refractory to withstand said heating.

References Cited
UNITED STATES PATENTS

| | | | |
|---|---|---|---|
| 2,400,099 | 5/1946 | Brubaker et al. | 260—41 |
| 2,478,229 | 8/1949 | Berry | 260—29.6 |
| 2,691,814 | 10/1954 | Tait | 260—41 |
| 2,795,510 | 6/1957 | Thompson | 106—286 |
| 3,019,206 | 1/1962 | Robb | 260—29.6 |
| 3,057,740 | 10/1962 | Skoning | 106—286 |

MORRIS LIEBMAN, *Primary Examiner.*

JULIUS FROME, *Examiner.*

K. B. CLARKE, A. LIEBERMAN, *Assistant Examiners.*